US012092526B2

(12) United States Patent
Gitzel et al.

(10) Patent No.: US 12,092,526 B2
(45) Date of Patent: Sep. 17, 2024

(54) APPARATUS FOR MONITORING A SWITCHGEAR

(71) Applicant: ABB Schweiz AG, Baden (CH)

(72) Inventors: Ralf Gitzel, Mannheim (DE); Subanatarajan Subbiah, Neulussheim (DE); Benedikt Schmidt, Heidelberg (DE)

(73) Assignee: ABB Schweiz AG, Baden (CH)

( * ) Notice: Subject to any disclaimer, the term of this patent is extended or adjusted under 35 U.S.C. 154(b) by 414 days.

(21) Appl. No.: 17/465,889

(22) Filed: Sep. 3, 2021

(65) Prior Publication Data

US 2022/0057271 A1 Feb. 24, 2022

Related U.S. Application Data

(63) Continuation of application No. PCT/EP2020/055471, filed on Mar. 2, 2020.

(30) Foreign Application Priority Data

Mar. 7, 2019 (EP) ..................... 19161440

(51) Int. Cl.
G01J 5/80 (2022.01)
G01J 5/00 (2022.01)
(Continued)

(52) U.S. Cl.
CPC ............. *G01J 5/80* (2022.01); *G01J 5/0066* (2013.01); *G01J 5/0096* (2013.01); *G06N 3/08* (2013.01);
(Continued)

(58) Field of Classification Search
CPC .......... G01J 5/80; G01J 5/0066; G01J 5/0096; G01J 2005/0077; G06N 3/08;
(Continued)

(56) References Cited

U.S. PATENT DOCUMENTS

| 11,415,464 B2* | 8/2022 | Pop ......................... G06F 1/305 |
| 2015/0296146 A1* | 10/2015 | Scanlon ................. H04N 23/11 |
| | | 348/82 |

(Continued)

FOREIGN PATENT DOCUMENTS

| CN | 103617469 A | 3/2014 |
| CN | 103839239 A | 6/2014 |

(Continued)

OTHER PUBLICATIONS

Wang et al., "SmartGuard: An Autonomous Robotic System for Inspecting Substation Equipment," *J. of Field Robotics*, 29(1): 123-137 (Nov. 16, 2011).

(Continued)

*Primary Examiner* — Nathaniel T Woodward
*Assistant Examiner* — Philip L Cotey
(74) *Attorney, Agent, or Firm* — Leydig, Voit & Mayer, Ltd.

(57) ABSTRACT

An apparatus for monitoring a switchgear includes: an input unit; a processing unit; and an output unit. The input unit is provides the processing unit with a monitor infra-red image of the switchgear. The processing unit implements a machine learning classifier algorithm to analyse the monitor infra-red image and determine if there is one or more anomalous hot spots in the switchgear. The machine learning classifier algorithm has been trained based on a plurality of different training infra-red images. The plurality of training infra-red images include a plurality of modified infra-red images generated from a corresponding plurality of infra-red images, each of the modified infra-red images having been modified to remove an effect of obscuration in the image. The output unit outputs information relating to the one or more anomalous hot spots.

17 Claims, 1 Drawing Sheet

Point of interest    Hot spot

(51) Int. Cl.
  *G06N 3/08* (2023.01)
  *G06T 5/70* (2024.01)
  *G06V 10/143* (2022.01)
  *G06V 10/30* (2022.01)
  *G06V 10/764* (2022.01)
  *G06V 10/82* (2022.01)
  *H02B 13/025* (2006.01)
  *G06N 3/045* (2023.01)
  *H02B 3/00* (2006.01)

(52) U.S. Cl.
  CPC .............. *G06T 5/70* (2024.01); *G06V 10/143* (2022.01); *G06V 10/30* (2022.01); *G06V 10/764* (2022.01); *G06V 10/82* (2022.01); *H02B 13/025* (2013.01); *G01J 2005/0077* (2013.01); *G06N 3/045* (2023.01); *G06T 2207/10048* (2013.01); *G06V 2201/06* (2022.01); *H02B 3/00* (2013.01)

(58) Field of Classification Search
  CPC . G06N 3/045; G06T 5/70; G06T 2207/10048; G06V 10/143; G06V 10/30; G06V 10/764; G06V 10/82; G06V 2201/06; H02B 13/025; H02B 3/00
  See application file for complete search history.

(56) References Cited

U.S. PATENT DOCUMENTS

| | | | |
|---|---|---|---|
| 2016/0035093 A1* | 2/2016 | Kateb | G02B 21/0012 382/131 |
| 2016/0284075 A1 | 9/2016 | Phan et al. | |
| 2017/0068614 A1* | 3/2017 | Jayaraman | G06F 11/3684 |
| 2018/0307947 A1* | 10/2018 | Choi | G06F 18/22 |
| 2019/0025773 A1* | 1/2019 | Yang | G06N 3/08 |
| 2019/0310137 A1* | 10/2019 | Pop | H04L 12/66 |
| 2020/0104567 A1* | 4/2020 | Tajbakhsh | G06V 40/165 |
| 2022/0357207 A1* | 11/2022 | Pop | H04N 7/181 |

FOREIGN PATENT DOCUMENTS

| | | |
|---|---|---|
| CN | 104217408 A | 12/2014 |
| CN | 106815821 A | 6/2017 |
| CN | 107680195 A | 2/2018 |
| CN | 108665487 A | 10/2018 |
| EP | 0342597 A2 | 11/1989 |
| WO | WO 2019/002507 A1 | 1/2019 |

OTHER PUBLICATIONS

European Patent Office, International Preliminary Report on Patentability in International Patent Application No. PCT/EP2020/055471, 9 pp. (Sep. 16, 2021).

European Patent Office, International Search Report in International Patent Application No. PCT/EP2020/055471, 4 pp. (Mar. 26, 2020).

European Patent Office, Written Opinion in International Patent Application No. PCT/EP2020/055471, 8 pp. (Mar. 26, 2020).

European Patent Office, Extended European Search Report in European Patent Application No. 19161440.3, 10 pp. (Sep. 10, 2019).

The Patent Office of the People's Republic of China, Office Action in Chinese Patent Application No. 202080019116.3, 11 pp. (Mar. 21, 2024).

* cited by examiner

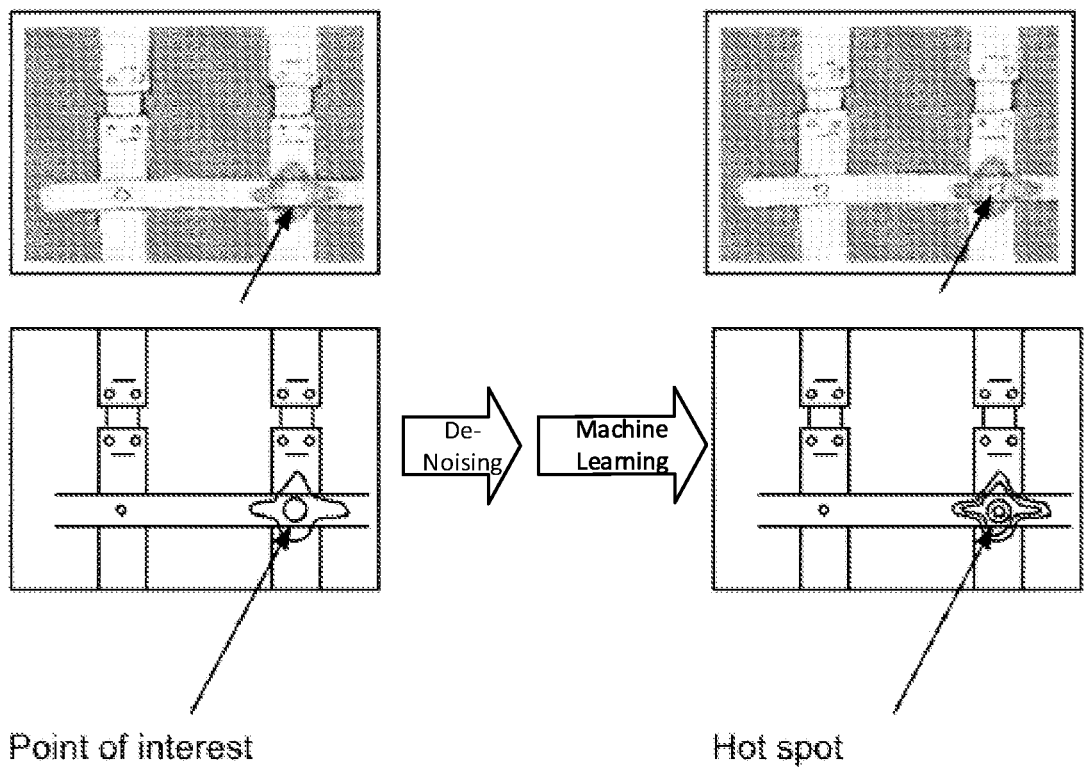

APPARATUS FOR MONITORING A SWITCHGEAR

CROSS-REFERENCE TO PRIOR APPLICATION

This application is a continuation of International Patent Application No. PCT/EP2020/055471, filed on Mar. 2, 2020, which claims priority to European Patent Application No. EP 19161440.3, filed on Mar. 7, 2019. The entire disclosure of both applications is hereby incorporated by reference herein.

FIELD

The present invention relates to an apparatus and system for monitoring a switchgear.

BACKGROUND

Switchgear failures due to high temperatures at hot spots can have dramatic consequences, for example electric arcs/flash overs that can act almost like explosions. A method for monitoring and early warning before such incidents is highly needed and currently not available, but this is not available in an affordable form, which could be installed as a standard in every switchgear and give enough information on the switchgear health state. Or where images are acquired and transmitted for processing elsewhere. Currently in utilities the measurement of temperature variations is one of the most common measurement indicators of the structural health of equipment and components. Corroded connections, faulty contacts, damaged components etc. can cause hotspots. Currently one common practice is to use infra-red cameras to capture thermal variation images and analyze them manually to find hotspots and then perform a maintenance action, where such manual inspection of the thermal images is carried out by domain experts from time to time to detect any damages in the components and additional data from current and voltage values are used to fuse with the infra-red images to detect damages. A further problem related to the utilisation of infra-red sensors in this way, is that some elements in switchgear, for example elements in circuit breakers that are anomalously hot can be obscured by foreign objects such as caps that do not transmit the infrared radiation and if in contact with the underlying part of the switchgear are not raised to the same temperature as that underlying element and/or have a lower emissivity. Thus, this obscuring element leads to a lower detection value in infra-red imagery required for damage detection. A common solution for all switchgear and all circuit breakers within such switchgear is not possible because of different types and geometry.

There is a need to address these issues.

SUMMARY

In an embodiment, the present invention provides an apparatus for monitoring a switchgear, the apparatus comprising: an input unit; a processing unit; and an output unit, wherein the input unit is configured to provide the processing unit with a monitor infra-red image of the switchgear, wherein the processing unit is configured to implement a machine learning classifier algorithm to analyse the monitor infra-red image and determine if there is one or more anomalous hot spots in the switchgear, wherein the machine learning classifier algorithm has been trained based on a plurality of different training infra-red images, the plurality of training infra-red images comprising a plurality of modified infra-red images generated from a corresponding plurality of infra-red images, each of the modified infra-red images having been modified to remove an effect of obscuration in the image, and wherein the output unit is configured to output information relating to the one or more anomalous hot spots.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an example of the removal of an obscuring element in an infrared image through utilisation of a de-noising autoencoder.

DETAILED DESCRIPTION

In an embodiment, the present invention provides an improved ability to monitor a switchgear.

In an aspect, there is provided an apparatus for monitoring a switchgear, the apparatus comprising:
an input unit;
a processing unit; and
an output unit.

The input unit is configured to provide the processing unit with a monitor infra-red image of a switchgear. The processing unit is configured to implement a machine learning classifier algorithm to analyse the monitor infra-red image and determine if there is one or more anomalous hot spots in the switchgear. The machine learning classifier algorithm has been trained on the basis of a plurality of different training infra-red images. The plurality of training infra-red images comprises a plurality of modified infra-red images generated from a corresponding plurality of infra-red images. Each of the modified infra-red images has been modified to remove the effect of obscuration in the image. The output unit is configured to output information relating to the one or more anomalous hot spots.

In this manner, the apparatus can determine if there are hot spots in switchgear and other electrical components more accurately, because a large training set can be conveniently generated based on visible imagery and where some of that imagery can be manipulated in order to provide a training data set that exhibits a greater portion indicating problems, and in this way this improves the ability to determine if there are hot spots over a wider range of situations for different switchgears and without human intervention.

In an example, generation of the plurality of modified infra-red images comprises utilisation of a trained image processing algorithm.

In an example, the trained image processing algorithm is a trained de-noising algorithm.

In an example, training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

In an example, analysis of the monitor infra-red image comprises modification of the monitor infra-red image to remove the effect of obscuration in the image.

In an example, modification of the monitor infra-red images comprise utilisation of a trained image processing algorithm.

In an example, the trained image processing algorithm is a trained de-noising algorithm.

In an example, training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

In an example, the image processing algorithm utilised to generate the plurality of modified infra-red images is the same image processing algorithm used to modify the monitor infra-red image.

In an example, the plurality of training infra-red images comprises image data of a switchgear.

In an example, the plurality of training infra-red images comprises image data of a switchgear.

In an example, the monitor infra-red image comprises image data of at least one circuit breaker.

In an example, the machine learning classifier algorithm is a neural network.

In an example, the neural network is a convolutional neural network.

In an example, the processing unit is configured to update the training of the machine learning classifier algorithm comprising utilisation of the monitor infra-red image.

In an example, the processing unit is configured to update the training of the machine learning classifier algorithm comprising utilisation of the modified monitor infra-red image In an example, the training update comprises a manual indication that the monitor infra-red image comprises no anomalous hot spots or a manual indication that the monitor infra-red image comprises one or more anomalous hot spots.

In an example, the training update comprises a manual indication that the modified monitor infra-red image comprises no anomalous hot spots or a manual indication that the modified monitor infra-red image comprises one or more anomalous hot spots.

In an example, the manual indication that the monitor infra-red image comprises one or more anomalous hot spots comprises a manual indication of one or more locations in the monitor infra-red image of the one or more anomalous hot spots.

In an example, the manual indication that the modified monitor infra-red image comprises one or more anomalous hot spots comprises a manual indication of one or more locations in the modified monitor infra-red image of the one or more anomalous hot spots.

In a second aspect, there is provided a system for monitoring a switchgear, the system comprising:
an infra-red camera; and
an apparatus for monitoring a switchgear according to the first aspect.

The infra-red camera is configured to acquire the monitor infra-red image of the switchgear.

The above aspects and examples will become apparent from and be elucidated with reference to the embodiments described hereinafter.

The apparatus and system enables hot spots in switchgear, for example in circuit breakers, and in other electrical equipment to be detected through identifying hot spots in infra-red imagery of this equipment, even when there are obscuring objects between surfaces that are being monitored, and that could be anomalously hot, and the infra-red sensor. To do this objects and elements that are "noise" data are automatically removed using machine learning approaches in infra-red images of hotspots on components or sub-systems of electrical assets. This de-noising effect uses relevant data and provides precise information on structural damages in a circuit breaker, switchgear or other electrical equipment components. This is achieved through utilization of a machine learning algorithm that has been trained on imagery, at least some of which has used a de-nosing autoencoder to perform the removal of obscuring features from infra-red images. A module is used to enable an operator or expert to mark potential obscuring elements on the infra-red images and a learning module that learns features that are obscuring and performs the de-noising action. Thus, a labelling mechanism is used to identify de-noising features, enabling thermal variation images with proper information to be retained, providing for reliable results in detecting hotspots using machine learning methods. The technical outcome of this solution allows maintenance and service engineers to get an indication of any abnormalities or hotspots in the circuit breakers by the detection mechanism based on machine learning models. In this way imagery can be provided order that the training set can be used to take into the account obscuring elements in infra-red imagery enabling the machine learning algorithm to be able to identify hot spots in different equipment types, from different vantage points and in different situations.

Thus, this is achieved by apparatus that comprises an input unit, a processing unit, and an output unit. The input unit is configured to provide the processing unit with a monitor infra-red image of a switchgear. The processing unit is configured to implement a machine learning classifier algorithm to analyse the monitor infra-red image and determine if there is one or more anomalous hot spots in the switchgear. The machine learning classifier algorithm has been trained on the basis of a plurality of different training infra-red images. The plurality of training infra-red images comprises a plurality of modified infra-red images generated from a corresponding plurality of infra-red images. Each of the modified infra-red images has been modified to remove the effect of obscuration in the image. The output unit is configured to output information relating to the one or more anomalous hot spots.

According to an example, generation of the plurality of modified infra-red images comprises utilisation of a trained image processing algorithm.

According to an example, the trained image processing algorithm is a trained de-noising algorithm.

According to an example, training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

According to an example, analysis of the monitor infra-red image comprises modification of the monitor infra-red image to remove the effect of obscuration in the image.

According to an example, modification of the monitor infra-red images comprise utilisation of a trained image processing algorithm.

According to an example, the trained image processing algorithm is a trained de-noising algorithm.

According to an example, training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

According to an example, the image processing algorithm utilised to generate the plurality of modified infra-red images is the same image processing algorithm used to modify the monitor infra-red image.

According to an example, the plurality of training infra-red images comprises image data of a switchgear.

According to an example, the plurality of training infra-red images comprises image data of a switchgear.

According to an example, the monitor infra-red image comprises image data of at least one circuit breaker.

According to an example, the machine learning classifier algorithm is a neural network.

According to an example, the neural network is a convolutional neural network.

According to an example, the processing unit is configured to update the training of the machine learning classifier algorithm comprising utilisation of the monitor infra-red image.

According to an example, the processing unit is configured to update the training of the machine learning classifier algorithm comprising utilisation of the modified monitor infra-red image According to an example, the training update comprises a manual indication that the monitor infra-red image comprises no anomalous hot spots or a manual indication that the monitor infra-red image comprises one or more anomalous hot spots.

According to an example, the training update comprises a manual indication that the modified monitor infra-red image comprises no anomalous hot spots or a manual indication that the modified monitor infra-red image comprises one or more anomalous hot spots.

According to an example, the manual indication that the monitor infra-red image comprises one or more anomalous hot spots comprises a manual indication of one or more locations in the monitor infra-red image of the one or more anomalous hot spots.

According to an example, the manual indication that the modified monitor infra-red image comprises one or more anomalous hot spots comprises a manual indication of one or more locations in the modified monitor infra-red image of the one or more anomalous hot spots.

As discussed above, the apparatus can be part of a system that has a camera that acquires the monitor infra-red image and provides this to the processing unit, via the input unit.

The apparatus and system are explained in more detail with reference to a circuit breaker in a switchgear, but this is just one example and the apparatus and system find utility to other parts of switchgear and many other types of electrical equipment, where hot spots can occur and be problematic.

Thus, it is convenient to set the scene. There is currently a strong interest in using infra-red data to assess a circuit breaker's health state, where hot spots are indicative of a problem and these hotspots are easy for a human to identify and interpret. Currently in utilities, the measurement of temperature variations is one of the most common measurement indicators of the structural health of equipment and components. Corroded connections, faulty contacts, damaged components etc. can cause hotspots. One common practice is to use infra-red cameras to capture thermal variation images and analyze them manually to find hotspots and then perform a maintenance action. However, additional elements covering the bus bars, for example, can obscure the capturing of original thermal variations through infra-red cameras to detect hotspots. However, using skilled technicians and engineers in this manner is very expensive. Machine learning algorithms are here utilised to achieve this without a human. However, machine learning algorithms require an extensive training dataset of relevant data, and this is difficult and expensive to provide, and when there are obscuring elements the training set data itself cannot be acquired. The apparatus and system described here addresses this situation.

Thus, the described apparatus and system provides a way to analyze an infra-red image as a whole and can take into account obscuring elements in the imagery that would otherwise lead to a reduced infra-red signal and to "noise" in the data that would otherwise lead a machine learning model to classify the situation incorrectly. For this purpose a machine learning algorithm (e.g. a convolutional neural network) is used. The network is trained with modified infra-red data, where a human has indicated where obscuring elements can be in imagery and the effects of those obscuring elements mitigated through use of a de-noising algorithm.

The de-noising algorithm used to remove the effects of obscuring elements in infra-red imagery of switchgear, circuit breakers, and other electrical system is shown in operation in FIG. 1. It operates in a similar manner to the de-noising autoencoder method that for example can remove watermarks such as "DRAFT" or other watermarks that overlay images. FIG. 1 shows image representationss and below associated line drawings. In the embodiment of FIG. 1 the point of interest is obscured, for example by a cap, and a thermal imaging based system may not identify a problem. After application of the obscuration removal algorithm, the thermal image now shows the full extent of the hot spot, enabling remedial action to be initiated.

Thus, the structural health of the components in electrical systems, such as circuit breakers, can be detected through hotspots created in the component. Infra-red cameras focusing on such components capture thermal variations to detect the hotspots. Using a neural network classifier algorithm to automate this process requires that it be trained with properly labelled images, and large numbers of such training images with and without problems are required to detect automatically such hotspots. There are several variants of circuit breakers, and the internal structure are very different and using data-driven approaches such as machine learning will therefore be challenging, as the quantity of relevant images do not exist in large numbers and obtaining such imagery requires long waiting periods to obtain them for various circuit breakers, for example when hot spots occur. Current practice is that a manual inspection of the thermal images is carried out by domain experts from time to time to detect any damages in the components and this might be detrimental if the elapsed monitoring period is large enough to have a damage happened in the meantime.

However, the above situation is further complicated in that obscuring elements can sit between the surface to be monitored, such as a joint, and the infra-red sensor. Such an obscuring element can for example be a cap over a joint, as shown in FIG. 1. To achieve there is provided the following elements:

Labelling Module: This element presents the infra-red images and normal images to experts and contains the functionality to mark elements that are potential obscuring parts, which can create noisy data in the infra-red image.

De-noising Module: This element extracts features based on the labels provided by the previous module and removes the "noise" to generate clean infra-red image data.

Classification Model Generator: This element gets the de-noised images generated by the previous module "De-noising Module" and is trained to generate a machine learning classification model for the circuit breaker (or other electrical equipment). This pre-trained model can then identify structural damages. The machine learning model that corresponds to a circuit breaker variant can detect and provide a technical result whether the breaker is undergoing any structural damage or not by classifying the infra-red image that is generated in the field.

Thus, in summary the apparatus and system enables:

1. Template for hotspot marking: The apparatus/system contains the feature that enables the domain expert to mark components that can potentially have hotspots and provides noise.

2. De-noiser: The apparatus/system extract features that represent obscuring elements and automatically generates clean infra-red images using de-noising autoencoders.

3. Pre-trained model generation: The apparatus/system generate respective pre-trained models based on the synthetically generated infra-red images for circuit breakers to automatically classify images given as input from a live system with infra-red cameras to detect hotspots. Here, synthetically generated refers to infra-red images that have been modified to remove the effect of obscuration in the image.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for monitoring a switchgear, the apparatus comprising:
a processor, wherein the processor is configured to:
obtain a monitor infra-red image of the switchgear,
implement a machine learning classifier algorithm to analyse the monitor infra-red image and determine if there is one or more anomalous hot spots in the switchgear, wherein analysis of the monitor infra-red image comprises modification of the monitor infra-red image to remove an effect of obscuration in the monitor infra-red image,
wherein the machine learning classifier algorithm has been trained based on a plurality of different training infra-red images of the switchgear, wherein the plurality of training different infra-red images comprises a plurality of modified infra-red images generated from a corresponding plurality of infra-red images, wherein each of the modified infra-red images having been modified to remove an effect of obscuration in the image, wherein generation of the plurality of modified infra-red images comprises utilisation of a trained image processing algorithm, and
output information relating to the one or more anomalous hot spots.

2. The apparatus of claim 1, wherein the trained image processing algorithm utilized in the generation of the plurality of modified infra-red images comprises a trained de-noising algorithm.

3. The apparatus of claim 1, wherein training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

4. The apparatus of claim 1, wherein modification of the monitor infra - red images comprise utilisation of a trained image processing algorithm.

5. The apparatus of claim 4, wherein training of the image processing algorithm comprises a manual indication of one or more obscuring features in at least one of the plurality of infra-red images prior to modification and/or a manual indication of one or more obscuring features in at least one visible image corresponding to at least one infra-red image of the plurality of infra-red images prior to modification.

6. The apparatus of claim 1, wherein the trained image processing algorithm utilized in modification of the monitor infra-red image comprises a trained de-noising algorithm.

7. The apparatus of claim 1, wherein the image processing algorithm utilised to generate the plurality of modified infra-red images is a same image processing algorithm used to modify the monitor infra-red image.

8. The apparatus of claim 1, wherein the monitor infra-red image comprises image data of at least one circuit breaker.

9. The apparatus of claim 1, wherein the machine learning classifier algorithm comprises a neural network.

10. The apparatus of claim 9, wherein the neural network comprises a convolutional neural network.

11. The apparatus claim 1, wherein the processor is configured to update a training of the machine learning classifier algorithm comprising utilisation of the monitor infra-red image as a monitor infra-red image training update.

12. The apparatus of claim 11, wherein the processor is configured to update a training of the machine learning classifier algorithm comprising utilisation of the modified monitor infra-red image as a modified monitor infra-red image training update.

13. The apparatus of claim 12, wherein the modified monitor infra-red image training update comprises a manual indication that the modified monitor infra-red image comprises no anomalous hot spots or a manual indication that the modified monitor infra-red image comprises one or more anomalous hot spots.

14. The apparatus of claim 13, wherein the manual indication that the modified monitor infra-red image comprises one or more anomalous hot spots comprises a manual indication of one or more locations in the modified monitor infra-red image of the one or more anomalous hot spots.

15. The apparatus of claim 11, wherein the monitor infra-red image training update comprises a manual indication that the monitor infra-red image comprises no anomalous hot spots or a manual indication that the monitor infra-red image comprises one or more anomalous hot spots.

16. The apparatus of claim 15, wherein the manual indication that the monitor infra-red image comprises one or more anomalous hot spots comprises a manual indication of one or more locations in the monitor infra-red image of the one or more anomalous hot spots.

17. A system for monitoring a switchgear, the system comprising:
 an infra-red camera; and
 the apparatus of claim 1,
 wherein the infra-red camera is configured to acquire the monitor infra-red image of the switchgear.

\* \* \* \* \*